(No Model.)
P. E. MATTHES.
LEAK STOPPER FOR PNEUMATIC TIRES.
No. 586,820. Patented July 20, 1897.
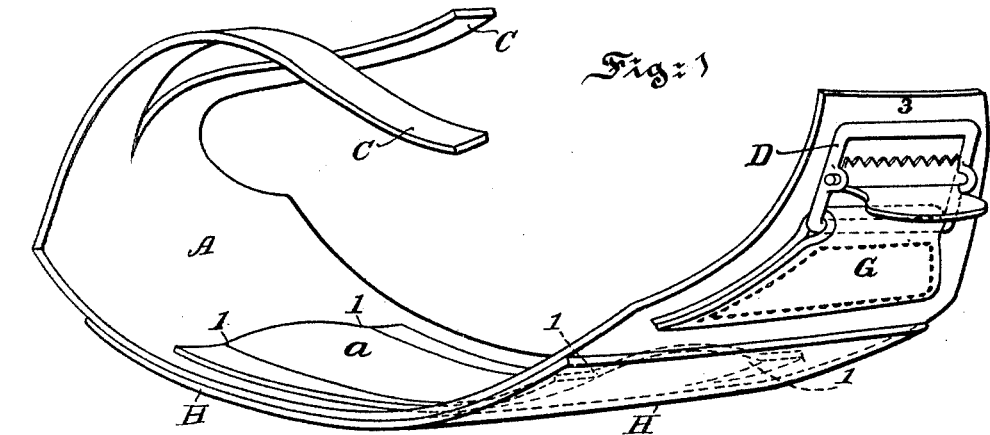
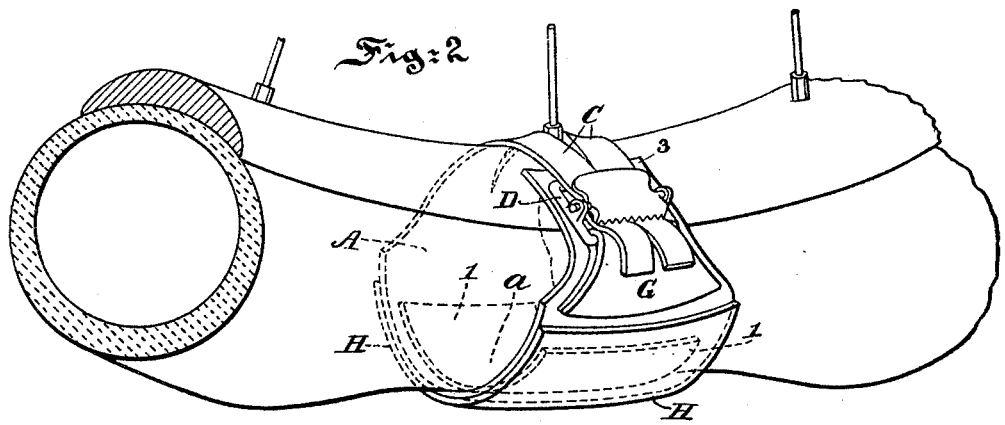
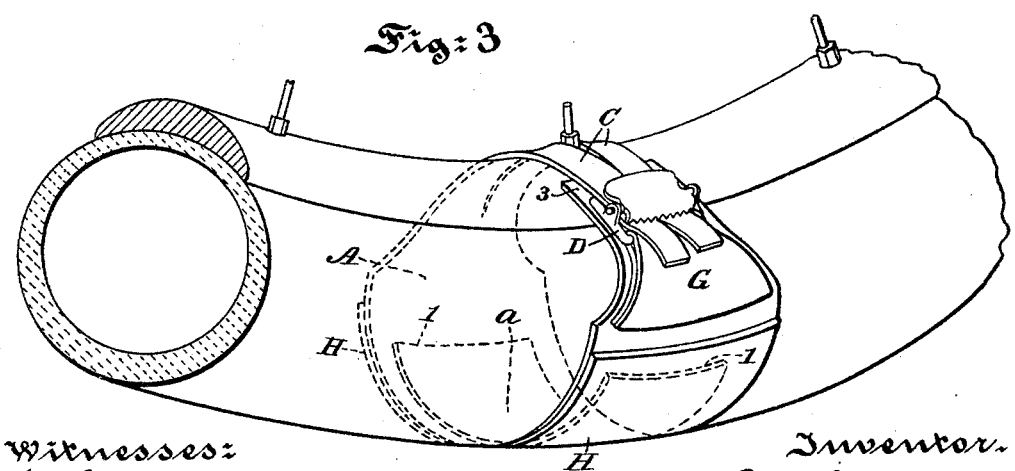
Witnesses:
W. A. Schaefer.
Geo. W. Reed.
Inventor.
Percy E. Matthes.
By Mark Wilks Collet.
Attorney

United States Patent Office.

PERCY E. MATTHES, OF PHILADELPHIA, PENNSYLVANIA.

LEAK-STOPPER FOR PNEUMATIC TIRES.

SPECIFICATION forming part of Letters Patent No. 586,820, dated July 20, 1897.

Application filed July 17, 1896. Serial No. 599,526. (No model.)

*To all whom it may concern:*

Be it known that I, PERCY E. MATTHES, a citizen of the United States, and a resident of the city and county of Philadelphia and State of Pennsylvania, have invented a new and useful Improvement in Leak-Stoppers for Pneumatic Tires, of which the following is a clear and sufficient specification, reference being had to the drawings annexed.

My invented device acts by cementing an air-tight material to the tire over the puncture, which cemented air-tight material is so secured to an inelastic flexible material, which is provided with fastenings encircling the rim, that the air-tight material can be cemented down over the puncture, which is sometimes a hole and sometimes a cut, when the tire is deflated, and when the tire is inflated the flexible non-elastic material above mentioned will give a firm unyielding support to the tire and hold it from spreading or swelling out at the puncture, while it does not interfere in any way with the resiliency of the tire or tend to make it slip. This supporting of the tire by the non-elastic material permits the wheel to be mounted and ridden a few minutes after the stopper is applied without waiting for the cement to harden.

Describing now the details of the best forms of which I am at present aware of constructing my invented device, Figure 1 is a perspective view of the device off the wheel. Fig. 2 is the same applied to the partly-deflated tire. Fig. 3 is a perspective view of the same applied to the fully-inflated tire.

Upon the inside of the bandage A, I place the patch $a$, in practice constructed of a thin sheet of india-rubber or similar material, and fasten it at the edges $l\,l$ to the bandage A. By making the patch partly loose from the bandage I can more conveniently bring it into contact with the entire surface of the tire around the puncture, especially in tires that fall in when deflated, which partially-detached piece can be readily pressed down upon the tire by inserting between it and the bandage A a finger or other means of pressure, and by its elasticity and flexibility produced by its thickness will readily follow the shape of the deflated tire.

The bandage A is made of an inelastic flexible material which will readily take the shape of tire as it is inflated, but will not stretch. This bandage will therefore hold the patch firmly down upon the tire and hold the tire firmly on all sides, preventing it from being overinflated and splitting around the puncture and making the whole force of the air-pressure serve to press the portions of the tire around the puncture down hard upon the patch $a$. This bandage I construct, preferably, of a material composed of rubber and canvas having a face of rubber on the side toward the tire. Such a material as belting is very satisfactory, as this material presents a face of pure rubber toward the tire, which prevents the outflow of air that may have gotten through the patch. This bandage A is provided with two tongues C C at one end and at the other with a buckle D, into which the tongues are passed and held. This buckle is secured onto the bandage A by the retaining material G, which is sewed or otherwise secured thereto. Its back part is spread out broad, so as to carry the pull of the tongues toward the edges of the bandage A. The two tongues are required, because the puncture may be opposite one of the spokes. To make the bandage wear well, I secure to the tread side thereof the facing-piece H, and to protect the rim of the bicycle from being scratched by the buckle I provide the bandage A with the flap 3, lying between the buckle and the rim.

In using my device I press the patch upon the tire and, inserting, if necessary, a finger or other pressure means behind it, press it down upon the broken tire, to which it will attach itself. I then secure the bandage in place by running the tongues through the buckle, drawing them as tight as necessary to make the bandage the size it should be when the tire is inflated. The air can, after a moment's waiting, be forced into the tire in the usual manner and the wheel ridden away.

Having now described my invention, what I claim, and desire to secure by Letters Patent, is—

The combination of a strap of flexible inelastic material, provided, at one end, with a buckle, and, at the other end, with a pair of tongues, a piece of flexible air-tight material cemented at some of its edges to the strap, and free from said strap at other edges and at its middle part and cement placed upon the inside of said flexible air-tight material substantially as described.

PERCY E. MATTHES.

Witnesses:
MARK WILKS COLLET,
T. J. W. DONATH.